Nov. 25, 1930.                F. H. AXELL                1,782,886
                       ATTACHMENT FOR CONTAINERS
                         Filed Jan. 29, 1929           2 Sheets-Sheet 1
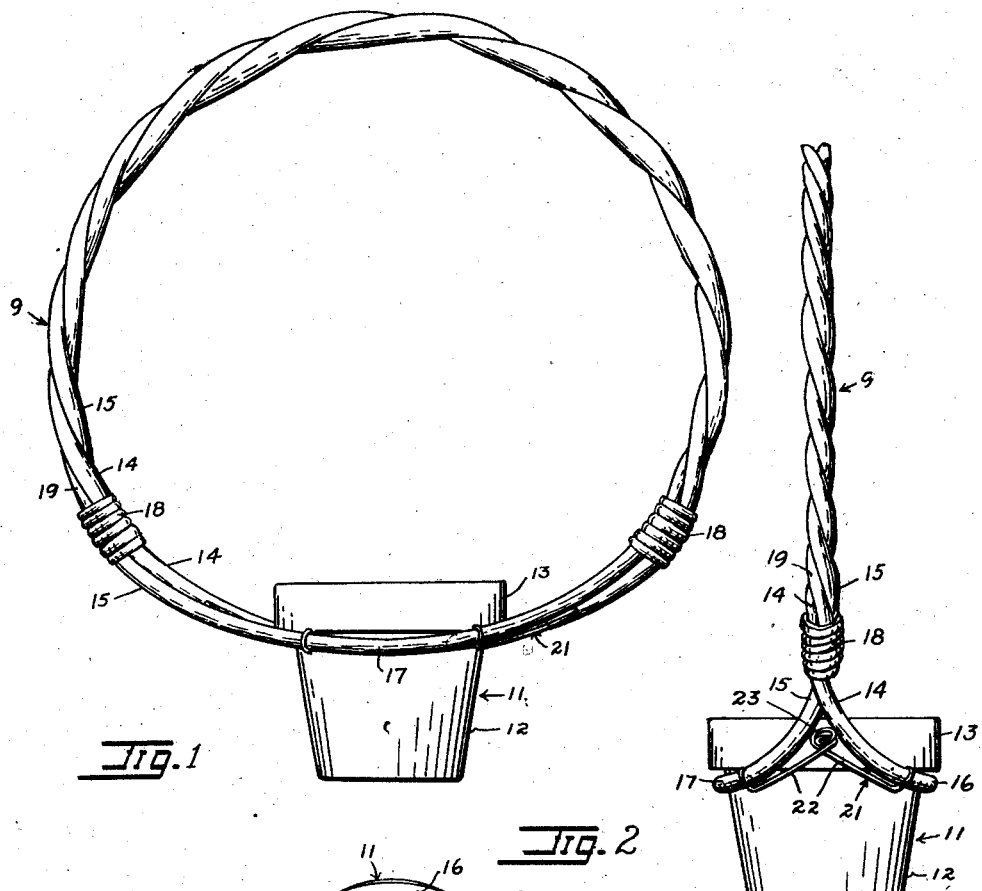
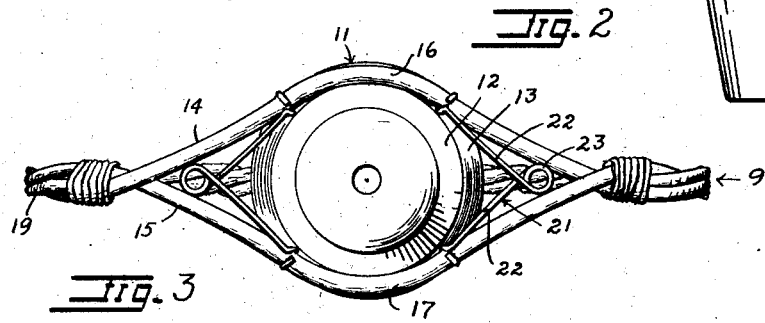
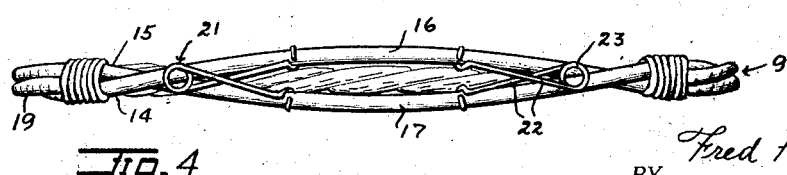
INVENTOR.
Fred H. Axell
BY
M. C. Frank
ATTORNEY Nov. 25, 1930.  F. H. AXELL  1,782,886
ATTACHMENT FOR CONTAINERS
Filed Jan. 29, 1929  2 Sheets-Sheet 2

INVENTOR.
Fred H. Axell
BY M. C. Frank
ATTORNEY.

Patented Nov. 25, 1930

1,782,886

UNITED STATES PATENT OFFICE

FRED H. AXELL, OF OAKLAND, CALIFORNIA

ATTACHMENT FOR CONTAINERS

Application filed January 29, 1929. Serial No. 335,940.

The invention relates to a handle member for attachment to containers such as are used for plants and flowers and other more or less decorative articles.

An object of the invention is to provide a member of the class described which is arranged to provide a detachable handle and/or decorative element for an article with which it is associated.

Another object of the invention is to provide a member of the character described which includes in unitary association therewith the necessary means for fixedly and releasably securing it to an article on which it is to be mounted.

A further object of the invention is to provide members of the character described so constructed that a given one thereof may be readily mounted on appropriate articles of different sizes.

The invention possesses other objects and features of advantage, some of which, with the foregoing, will be set forth in the following description of a preferred form of the invention which is illustrated in the accompanying drawings, in which:

Figures 1 and 2 are elevations showing one embodiment of the handle member mounted on a container, the planes of viewing being mutually perpendicular.

Figure 3 is a bottom view of the assembly of Figure 1.

Figure 4 is a bottom view of the member as it appears when dismounted from the container.

Figures 5, 6, 7:
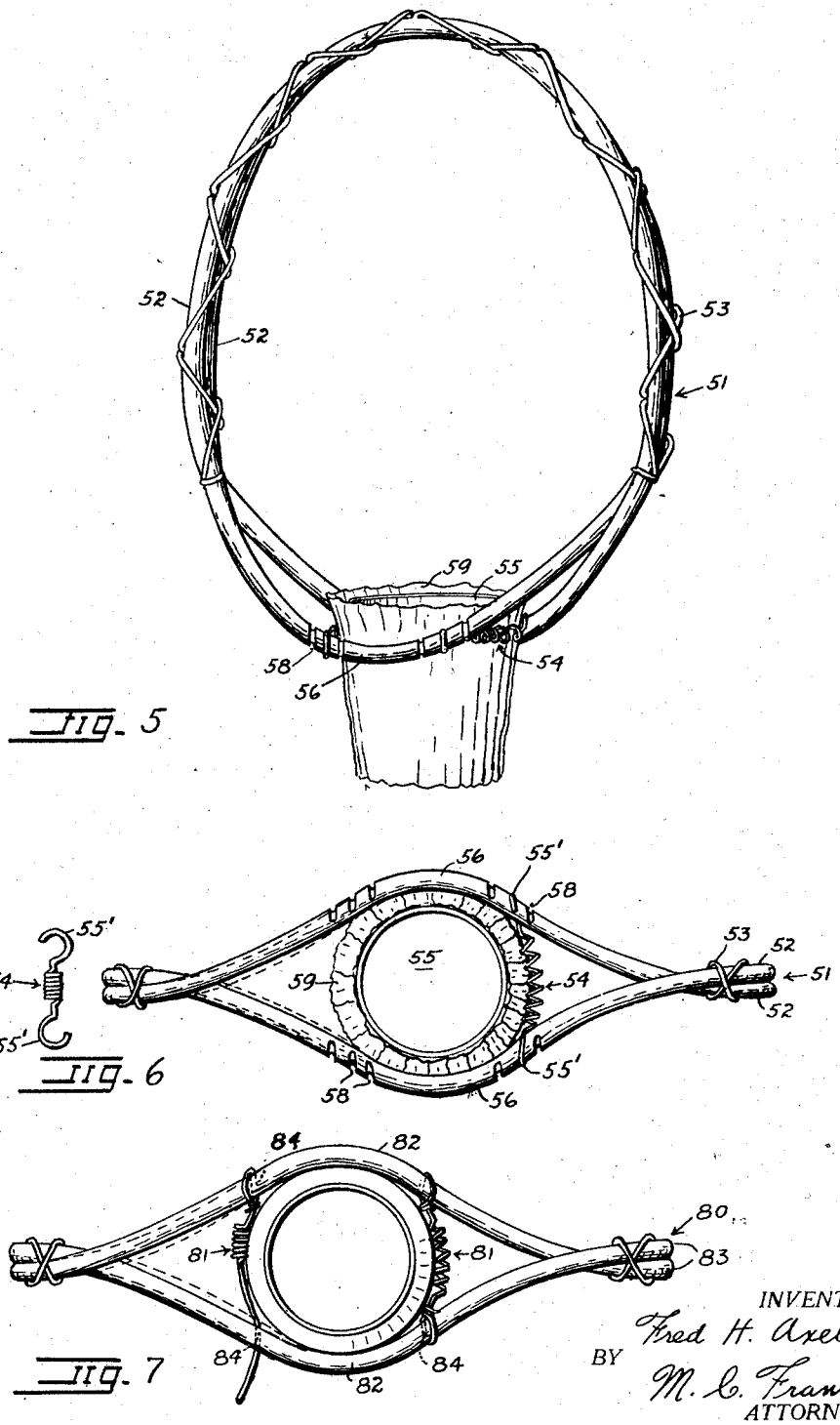
Figure 5 is a perspective view showing another embodiment of the member mounted on a container decorated with crepe material.
Figure 6 is a bottom view of the assembly of Figure 5, one spring element thereof being shown as removed.
Figure 7 is a view similar to Figure 6 disclosing a member having an alternative spring means and mounting.

As particularly disclosed in Figures 1 to 4 inclusive, the device of my invention is incorporated in the structure of a handle member 9 which is shown as mounted on a container 11; in the present instance, the container 11 is seen to comprise a flower pot of generally frusto-conical outline having a sloping side 12 terminating in a protruding annular rim 13. Essentially, the member 9 is formed of a pair of flexible rod elements 14 and 15 entwined to provide a closed loop, said loop being circular or elliptical as desired. Opposed portions 16 and 17 of the elements 14 and 15 respectively are arranged for separation to permit the engagement of the container 11 between them, said portions being flexed around the top of the container wall 12 and engaging beneath the rim 13. The portions 16 and 17, when the latter are engaged about a container, are seen to co-operatively define an eye or loop having its axis perpendicular to that of the handle loop. Preferably, and as shown, the portions 16 and 17 are fixed together at their mutually engaged ends by suitable ties 18.

It will now be noted that the elements 14 and 15 are preferably, though not necessarily, formed of single lengths of wicker rod whereby they are flexible for shaping and resilient for maintaining their looped form and entwined engagement. Since such rods are relatively light for their size, a handle made thereof is of requisite size both as to appearance and use and is at the same time relatively light. In the present instance, and in keeping with the use of the wicker rods, the ties 18 are made of withes. It is to be noted, however, that the elements 14 and 15 and ties 18 might be formed of a metal having required qualities as to flexibility and resiliency. In any case, the separation of the portions 16 and 17 to provide the container receiving eye is seen to be resiliently resisted, so that these portions constitute in effect, clamp jaws cooperative to grip the container between them.

It will, of course, be obvious that the maximum size of the container receiving loop is limited only by the elastic limit of the material of the loop sides 16 and 17, so that containers of a wide range of sizes may be interchangeably engaged in said loop. And it is further noted that the portions 16 and 17 may constitute elements which are distinct from the remainder of the handle structure, the present structure being provided in the interests of structural simplicity and inexpensiveness. If desired, additional elements may be provided for building up the thickness of the member 9 away from the container gripping portion thereof; in the present instance, this is effected by the addition of a third rod element 19 entwined with the elements 14 and 15 and extending from and between the ties 18.

Since the resiliency of any material which might be used to provide the clamp jaw portions 16 and 17 of the handle member is subject to weakening by fatigue and the pressure exerted against a gripped article by reason of such resiliency may not be sufficient to retain the article between the jaws 16 and 17, means are preferably provided for independently effecting the required pressure engagement of the jaws with an article. Accordingly, and as shown, springs are provided for urging the jaws toward each other and about the container 11. As particularly disclosed in the embodiment of Figures 1 to 4 inclusive, the springs 21 are provided, said springs being each formed of spring wire to have end portions 22 extending as arms from an intermediate helical coil portion 23; as shown, the spring arm portions are relatively long and extend radially from the axis of the coil 23. The coils 23 are arranged to lie adjacent the ties 18 and in the angle defined by the jaws 16 and 17, while the extremities of the spring arms 22 of each spring are fixed to the jaws 16 and 17 at points toward the centers thereof whereby the spring arms 22 substantially parallel the jaws. As shown, the arm extremities are looped and clamped about the jaws 16 and 17 in fixed engagement therewith. It will now be clear that the springs 21 are positively operative to force the jaws 16 and 17 toward each other and around an article embraced thereby without necessarily contacting the container, and the disposal of the spring is at the same time such that it is not conspicuous.

Referring now to the embodiment of Figures 5 and 6, it is seen that the handle member 51 is formed of a pair of like and looped rod elements 52 abutting in coaxial relation and bound together by means of a tie member 53 wound spirally around the elements. While the rods 52 are preferably of resilient material, springs 54 are provided for disposal at opposite sides of a container 55 to effect a drawing of the jaws together and against the container as for the previously described embodiment. In the present instance, however, the springs 54 are of a helical tension type, and the spring ends are provided with hooks 55' for engagement with the jaw portions 56 in such manner that when the springs 54 are operatively disposed they engage along and around opposite sides of the container 55 and so also directly assist in retaining it in fixed relation to the handle 51. Preferably, and as shown, the jaws 56 are provided with notches 58 therealong for receiving the spring hooks 55', whereby an adjustable mounting of the springs 54 is provided for; in this manner, the adjustment of the springs 54 along the jaws 56 and to engage a container in desired relation may be readily effected for containers of varying size. It is noted that when the present form of the handle is used with containers having fragile outer coverings 59, the separately installable springs 54 assist in holding said covering in place.

In the modification disclosed in Figure 7, it is seen that the springs 21 and 54 of the previously described embodiments are replaced by helical tension springs 81 engaging between jaw members 82 provided by rod elements 83 of a member 80. The ends of the springs 81 are engaged through perforations 84 provided in the jaws 82 whereby the springs may be pulled out to have any desired tension and the spring ends then tied about the jaws at the perforations. This arrangement is seen to provide for an adjustment of the spring tension, such a provision not being seen in the previously described embodiment. Except for the springs 81 and the mounting provided therefor, the embodiment of Figure 7 is similar to the previously described embodiments.

It will be noted that the members 9, 51, and 80, while disclosed as handles, need not be so used, as the members may be applied purely as ornaments to many articles such as flower pots, flower bowls, fish bowls, etc. Furthermore, the exact character and structure of the article engaged is immaterial, provided only that the clamping loop of the jaws be opened to receive an article to be gripped.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claims.

Having thus described my invention, I claim as new and desire to secure by Letters Patent of the United States the following:

1. A member for mounting on a generally cylindrical object comprising a pair of continuous and like looped resilient elements fixed together along their lengths and having mutually opposed portions thereof resiliently separable for gripping the object between them.

2. In a handle member for mounting on a generally cylindrical object, a pair of like elements defining closed loops fixed together at spaced points along their lengths and having mutually opposed portions between said points resiliently separable for engaging and gripping the object between them.

3. In a handle member for mounting on a generally cylindrical object, a pair of elements constantly fixed together at spaced points along their lengths and having mutually opposed portions between said points mutually separable for engaging the object between them and means constantly urging said portions together whereby said object may be forcibly and resiliently gripped between them.

4. In a handle member for mounting on a generally cylindrical object, a pair of generally like loop elements formed of resilient material and fixed together in coaxial relation at spaced points along their length, mutually opposed portions between a pair of said points being arranged for mutual separation axially of the loops for resiliently clasping the object between them.

5. In a handle member for mounting on a generally cylindrical object, a pair of generally like loop elements formed of flexible rod material and fixed together in coaxial relation at spaced points along their length and having mutually opposed portions between a pair of said points separable to provide an opening for receiving the object, and spring means operative between said portions to urge them together whereby said object may be forcibly gripped by and between said portions.

6. In a handle member for mounting on a generally cylindrical container, a pair of opposed and resiliently flexible rod elements fixed together in generally parallel relation and at spaced points thereof and separable between said points to provide an opening for resiliently gripping the object between them.

7. In a handle member for mounting on a generally cylindrical object, a pair of generally like and planar loop elements formed of resiliently flexible rod material and fixed together in generally parallel relation at spaced points along their length and having mutually opposed portions between a pair of said points separable axially of the loops to provide an opening for receiving the object in resiliently gripped engagement therein.

8. In a handle member for mounting on a generally cylindrical object, a pair of generally like and planar loop elements formed of resiliently flexible rod material and fixed together in generally parallel relation at spaced points along their length and having mutually opposed portions between a pair of said points separable axially of the loops to provide an opening for receiving the object, and spring means operative between said portions to resist said separation thereof.

9. In a handle member for mounting on a generally cylindrical object, a pair of generally like and planar loop elements formed of resiliently flexible rod material and fixed together in generally parallel relation at spaced points along their length and having mutually opposed portions between a pair of said points separable axially of the loops to provide an opening for receiving the object, spring means operative between said portions to resiliently and yieldingly resist said separation thereof, and means to adjustably vary the resistance of said spring means.

In testimony whereof, I affix my signature.

FRED H. AXELL.